Feb. 7, 1928.
J. E. MARSDEN
1,658,453
CUSHIONED GLASS RECEPTACLE
Filed April 7, 1927  2 Sheets-Sheet 1
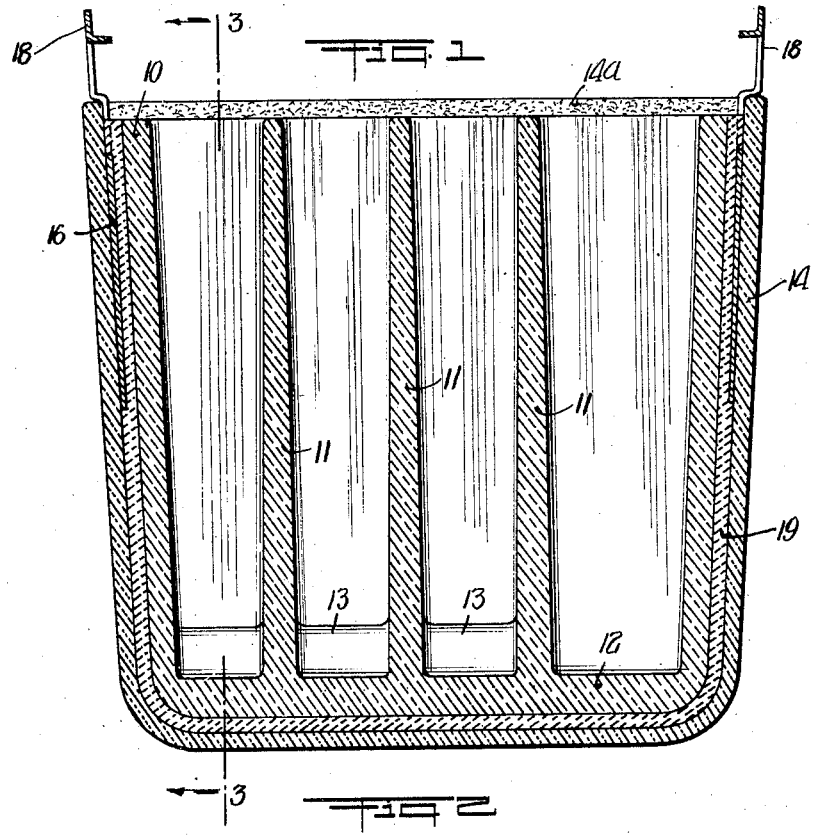
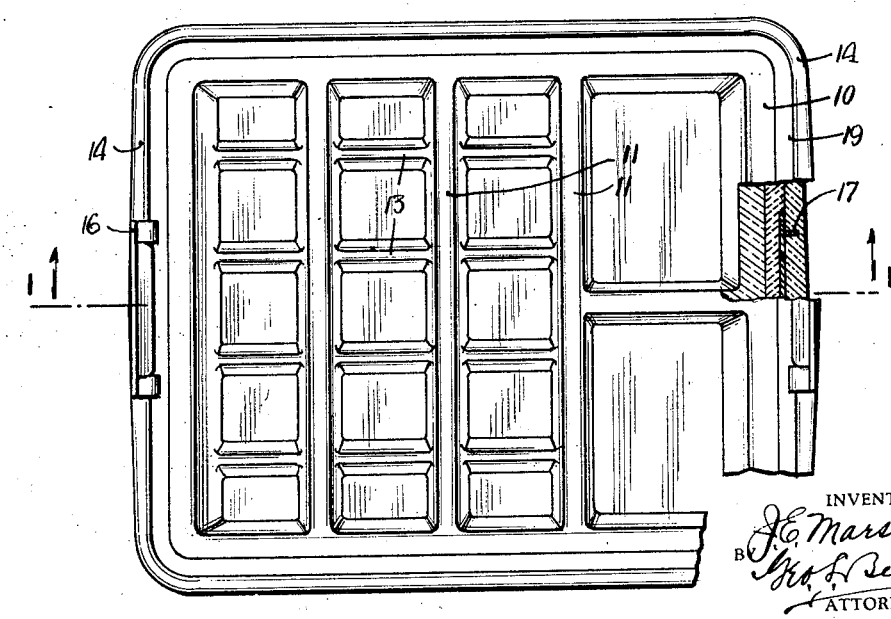
INVENTOR
J. E. Marsden
BY
ATTORNEY Feb. 7, 1928.
J. E. MARSDEN
1,658,453
CUSHIONED GLASS RECEPTACLE
Filed April 7, 1927   2 Sheets-Sheet 2
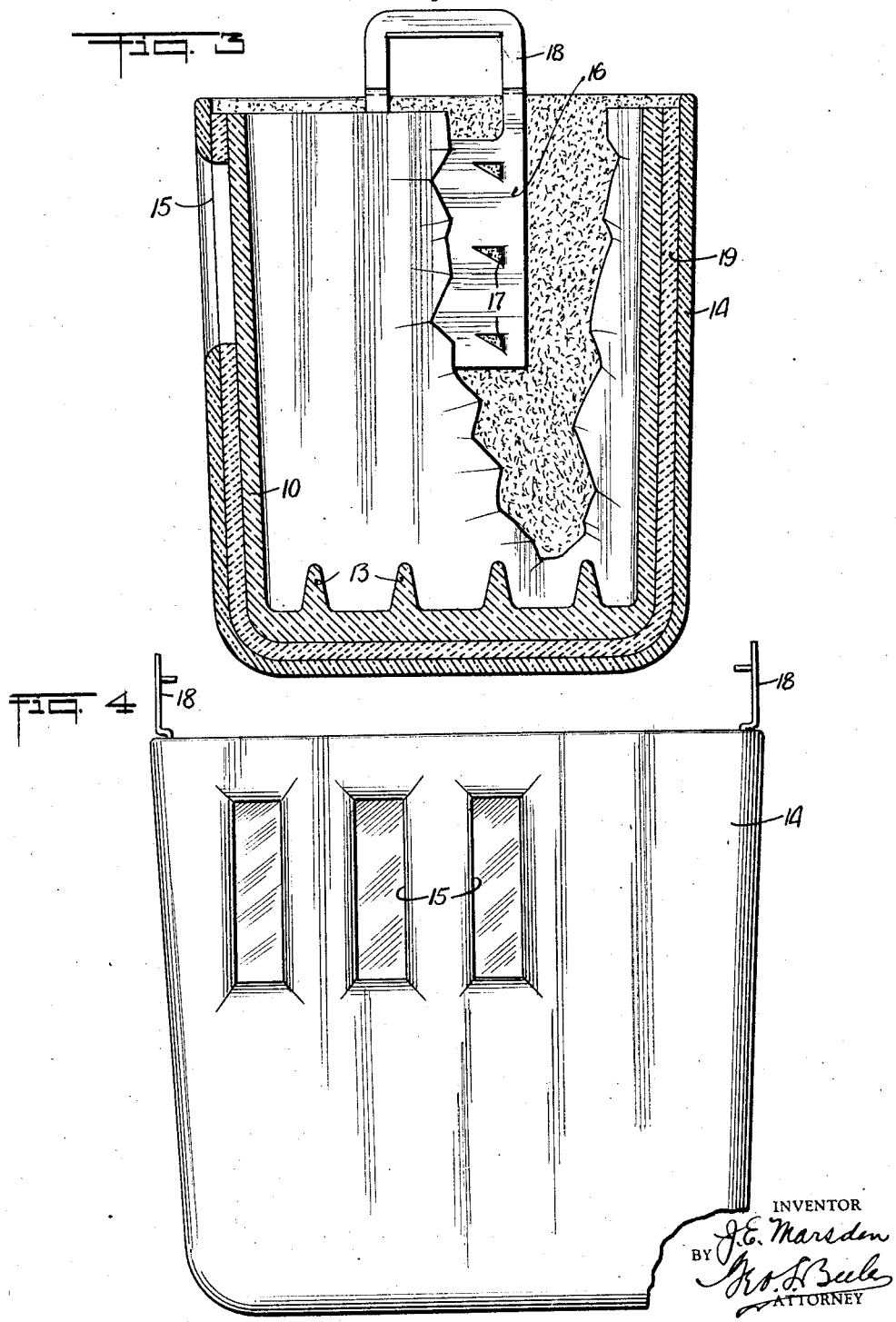

Patented Feb. 7, 1928.

1,658,453

UNITED STATES PATENT OFFICE.

JOHN E. MARSDEN, OF PHILADELPHIA, PENNSYLVANIA.

CUSHIONED GLASS RECEPTACLE.

Application filed April 7, 1927. Serial No. 181,643.

This invention relates to heavy receptacles made ordinarily of glass and adapted to be subjected to rough usage or handling and has particular reference to battery jars made of glass together with casing and cushion means for enclosing and supporting the glass battery jar.

Among the objects of the invention is to provide a storage battery or its equivalent having an acid proof cell structure, a strong casing of insulating material, and a cushion of packing material of a strong and durable nature interposed between the cell structure and the casing.

Another object of the invention is to provide a storage battery having a glass cell structure with partitions therein for individual groups of electrode plates and a cushioning casing enclosure for the cell structure and having arranged suitable windows for the observation of the condition of the electrolite in the several cells.

A still further object of the invention is to provide an acid proof structure, an insulating supporting casing, and a cushion of non-hardening leak proof composition between the cell structure and the casing.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a vertical longitudinal section of a preferred embodiment of the invention on the line 1—1 of Fig. 2.

Fig. 2 is a plan view of the same, parts being broken away.

Fig. 3 is a vertical transverse section on the line 3—3 of Fig. 1.

Fig. 4 is a side elevation.

Referring now more specifically to the drawings I show a storage battery or its equivalent comprising three principal parts. A cell structure 10 made preferably of glass and having some of the characteristics of the cell structure illustrated and described in my co-pending companion application, filed of even date herewith, Serial No. 181,642, the same having a plurality of vertical partitions 11 integral with the bottom 12 and extending upward therefrom to the top of the receptacle and having also longitudinally arranged projections or plate rests 13 integral with the bottom and lower portions of the partitions and extending upward from the bottom. The bottom surface of the receptacle or cell structure 10 may be variously designed according to the shape of the finished product and the supporting shell or casing therefor, but indicated herein as substantially flat.

Surrounding the receptacle 10 and spaced therefrom is a casing 14 of any suitable strong preferably plastic composition such as asbestos or cork composition, mineral plaster, cellulose, parlin, or the like. This casing is substantially parallel to the outer surface of the receptacle 10 and extends upward slightly above it at 14$^a$ to provide for a lid or cover, not shown, the cover to come within the top portion of the casing. Either or both sides of the casing are provided with a series of windows or sight openings 15 corresponding to and registering with the majority of the cells formed in the receptacle 10 between the partitions 11. These windows extend upward to a substantial distance so as to enable the observer to notice the height of the electrolite in the cells and into which the plates, not shown, are plunged. The construction of the cell fillers, not being a part of my present invention, is not elaborated upon in this specification.

At either side wall of the casing, preferably at the ends thereof and opposite each other, are a pair of handles 16, each made of sheet metal and mainly flat throughout, and from the body of which are struck a plurality of prongs 17 adapted to be driven into the body of the casing as shown in Figs. 2 and 3. The upper bail portion 18 on each handle member is deflected outward over the upper edge of the adjacent wall of the casing and thence upward parallel to the main portion forming a convenient finger piece.

Filling the space between the receptacle 10 and the casing 14, said space being of uniform cross section except where the handles are interposed, is introduced a mass of plastic material 19 of a non-hardening composition such as asphalt tar or the like, the same filling the entire space up to the upper edge of the receptacle 10, making a complete cover for the bottom and sides of the receptacle and being furthermore of such a composition as to constitute a cushion, preventing breakage or damage to the receptacle when the construction is subjected to rough usage, and serving, furthermore, as a self sealing means for the receptacle walls should perchance a crack or flaw develop therein. Thereby the electrolite or acid composition carried by the receptacle will be prevented from dripping or spilling and the danger of short circuits will be practically eliminated.

I claim:

1. In a battery container, an inner receptacle of transparent material having a bottom and side walls, a casing surrounding and spaced from the receptacle, and a cushion filling the space between the receptacle and the casing and guarding the receptacle from damage, the casing and cushion being provided with registering sight openings in the side through which the receptacle and the interior conditions of the receptacle may be observed.

2. A battery container as set forth in claim 1 in which the receptacle is of vitreous material and the cushion consists of a viscous, non-hardening composition adapted to seal automatically any flaws or the like that may develop in the receptacle.

3. A battery container as set forth in claim 1 in which the receptacle is of molded glass and includes upright partitions integral with the bottom and side walls, forming independent cells, and the registering sight openings pertain to a plurality of cells respectively.

In testimony whereof I affix my signature.

JOHN E. MARSDEN.